Patented Nov. 4, 1930

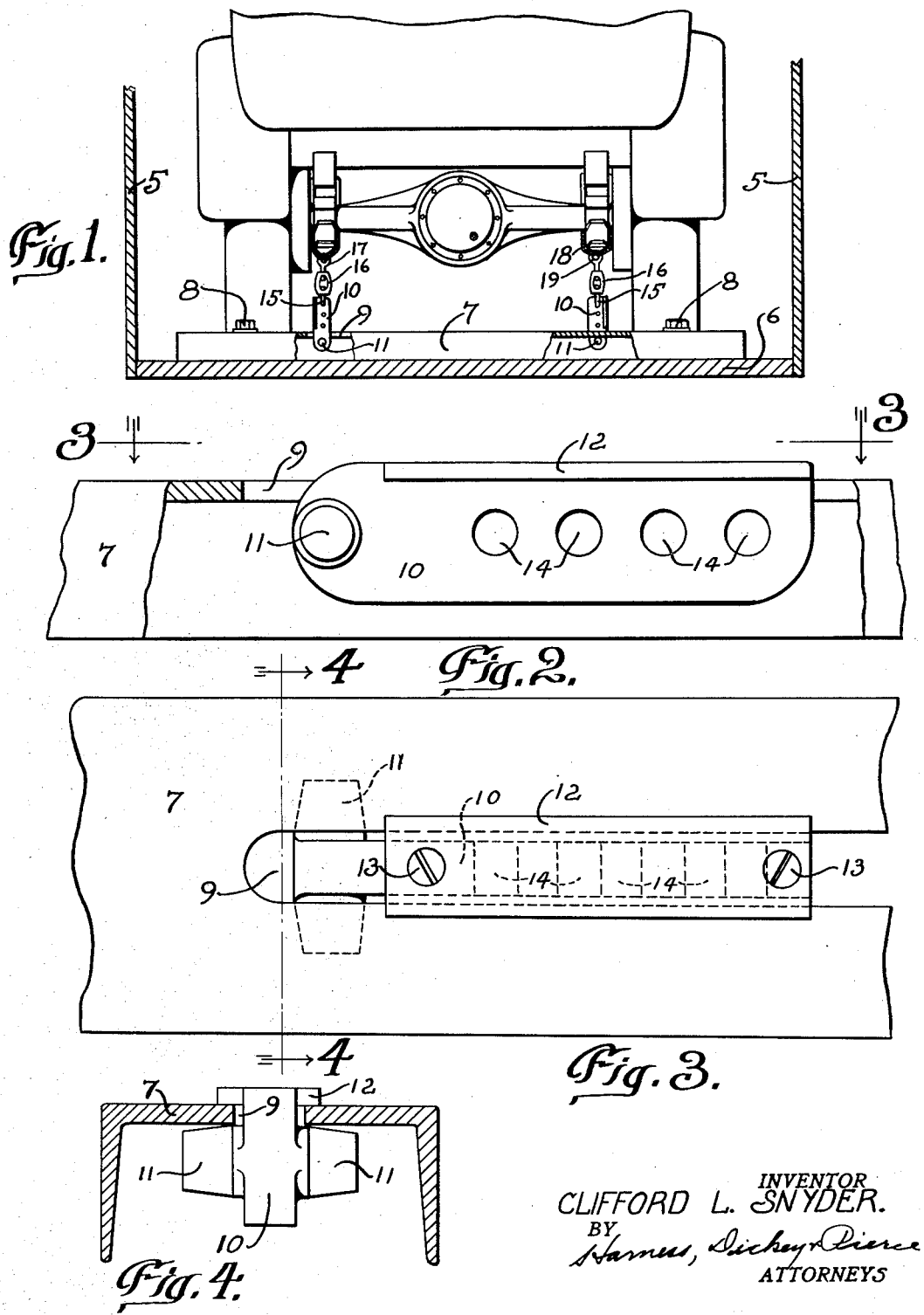

1,780,317

UNITED STATES PATENT OFFICE

CLIFFORD L. SNYDER, OF DETROIT, MICHIGAN, ASSIGNOR TO THE EVANS AUTO LOADING CO. INC., A CORPORATION OF DELAWARE

SHIPPING DEVICE

Application filed February 27, 1929. Serial No. 343,087.

It has been contemplated to provide devices in the floors of freight cars or the like to which securing members may be attached for securing motor vehicles or the like for shipment. The primary object of this invention is to provide a simple and economical device which may be secured to the devices which are placed in the freight car floors and may be permitted to remain with said devices, whether they are in use or not, but which will permit of ready attachment to vehicle hold-downs or the like when vehicles are being shipped.

More specifically, my invention contemplates the provision, with a member secured to the freight car floor, of an attaching device which is adjustably secured to said member and which provides ready means of attachment for a simple and economical hold-down device.

With the above and other objects in view, my invention consists in the arrangement, combination and construction of the various parts of my improved device as described in the specification, claimed in my claims and shown in the accompanying drawings, in which:

Fig. 1 is a transverse sectional view of a freight car floor and side walls, showing one end of a vehicle mounted therein in accordance with my invention.

Fig. 2 is an enlarged view, partly in section and partly in elevation, showing a hold-down attachment member embodying my invention, said member being shown in the position which it assumes when not in use.

Fig. 3 is a view taken on line 3—3 of Fig. 2.

Fig. 4 is a view taken on line 4—4 of Fig. 3.

I have shown a car or housing construction comprising side walls 5 and a floor 6. To the floor 6 is secured, by bolts 8, channel cross member 7 which is adapted to act as a portion of the means for securing to the floor of the car a vehicle to be shipped. The channel member 7 is provided with a pair of spaced slots 9, through each of which a member 10 extends. Each member 10 is provided, adjacent one end with a cross piece 11, which may be formed integrally therewith, and which is rounded in form to permit oscillation of the member, while preventing dislocation thereof from its slot 9. Each member 10 is provided with a flat plate 12, secured thereto by screws 13, so as to prevent the member 10 from falling downwardly through its slot 9. It will be readily understood that when assembling each member 10 to its channel 7, the plate 12 is removed and it is secured in place only after the member 10 has been extended from the under side of the channel 7 through the slot 9.

Each member 10 is provided with a plurality of apertures 14, in any of which a hook 15 may be secured. The upper end of the hook 15 may be secured in one half of a turnbuckle 16. The opposite end of the turnbuckle 16 may likewise be secured to a headed member 17, which has a cable 18 engaged in the eye 19 thereof. Turning of the turnbuckle 16 will adjust the hold-down so formed as may be desired.

It will be readily understood that when vehicles are not being shipped in the freight car, the members 10 may lie flat on the channel members 7 so as to take up little room, render breakage unlikely, and at the same time be instantly available for use when it is desired to ship vehicles. It thus becomes necessary for the shipper to provide merely a hold-down device, which device may be of any simple and economical construction.

I desire it to be understood that I have herein shown and described only one form of my invention and that various changes may be made in the arrangement, combination and construction of the various parts of my improved device without departing from the spirit of my invention. It is my intention to cover by my claims such changes as may be reasonably included within the scope of my invention.

What I claim is:

1. In combination, a supporting floor, a channel member secured to the floor and having a slot therein, a second member secured to the channel member through the slot, being movable along the slot, said second member being also movable to extend substantially vertical or substantially horizontal, as desired, and having means thereon for attachment of a vehicle hold-down.

2. In combination, a supporting floor, a channel member secured to the floor and having a slot therein, a second member secured to the channel member through the slot, being movable along the slot, said second member including a portion beneath the web of the channel and a portion extended through the slot to a point above the channel and having means for attachment to a vehicle hold-down, said second member being movable in an arc with the portion beneath the channel web as a pivot.

CLIFFORD L. SNYDER.